US009920192B2

(12) United States Patent
Funderburg, Jr. et al.

(10) Patent No.: US 9,920,192 B2
(45) Date of Patent: Mar. 20, 2018

(54) POLYMERIC COMPOSITIONS WITH IMPROVED NOISE SUPPRESSION

(71) Applicant: Eastman Chemical Company, Kingsport, TN (US)

(72) Inventors: Michael Dean Funderburg, Jr., Gray, TN (US); Joseph Alexander DeLoach, Jonesborough, TN (US); Terri Roxanne Carvagno, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 46 days.

(21) Appl. No.: 15/159,165

(22) Filed: May 19, 2016

(65) Prior Publication Data
US 2017/0335096 A1    Nov. 23, 2017

(51) Int. Cl.
C08L 27/06 (2006.01)
B05D 3/00 (2006.01)
F16F 15/02 (2006.01)
C08K 5/12 (2006.01)

(52) U.S. Cl.
CPC .............. *C08L 27/06* (2013.01); *B05D 3/007* (2013.01); *F16F 15/02* (2013.01); *F16F 2224/02* (2013.01)

(58) Field of Classification Search
CPC ....... C08K 5/0016; C08L 27/06; C08L 31/04; C08L 33/08; C08L 93/04; F16F 15/00; B05D 3/007
USPC ................ 524/270, 273, 285, 295, 296, 297
See application file for complete search history.

(56) References Cited

U.S. PATENT DOCUMENTS

| 3,307,992 | A | * | 3/1967 | Condon ............... D04H 3/12 156/181 |
| 4,346,782 | A | | 8/1982 | Bohm |
| 4,548,746 | A | * | 10/1985 | Duncan ............... C09F 1/04 530/213 |
| 4,887,732 | A | * | 12/1989 | Matsubayashi ...... B21D 51/383 220/269 |
| 5,741,824 | A | | 4/1998 | Butschbacher et al. |
| 5,756,555 | A | | 5/1998 | Wesch et al. |
| 6,559,213 | B2 | | 5/2003 | Wesch |
| 7,297,738 | B2 | * | 11/2007 | Gosse ................. C08K 5/12 524/285 |
| 8,088,446 | B2 | | 1/2012 | Billast |
| 2004/0266927 | A1 | | 12/2004 | Prejean et al. |
| 2009/0130316 | A1 | | 5/2009 | Billast |
| 2016/0075855 | A1 | | 3/2016 | Funderburg et al. |
| 2016/0075856 | A1 | | 3/2016 | Funderburg et al. |
| 2016/0075857 | A1 | | 3/2016 | Funderburg et al. |
| 2016/0075858 | A1 | | 3/2016 | Funderburg et al. |
| 2016/0075890 | A1 | | 3/2016 | Funderburg et al. |
| 2016/0075891 | A1 | | 3/2016 | Funderburg et al. |
| 2016/0075905 | A1 | | 3/2016 | Funderburg et al. |

FOREIGN PATENT DOCUMENTS

| CN | 103 483 957 A | 1/2014 |
| CN | 105 440 643 A | 3/2016 |
| GB | 1400610 A | 7/1959 |
| JP | 2007 051303 A | 3/2007 |
| WO | WO 99/58597 A1 | 11/1999 |
| WO | WO 2006/105620 A1 | 10/2006 |
| WO | WO 2008/011536 A2 | 1/2008 |

OTHER PUBLICATIONS

Funderburg, Michael; "The Effect of Plasticizers on Vibration Damping in Polyvinyl Chloride (PVC) Formulations" presentation for Society of Automated Engineers Noise and Vibration Conference and Exhibition in Grand Rapids, Michigan; Jun. 23, 2015.
Society of Automated Engineers (SAE) Recommended Practice J1637-07, "Laboratory Measurement of Composite Vibration Damping Properties of Materials on a Supporting Steel Bar"; Jun. 2013.
Sperling, L. H. and Fay, J. J.; "Factors Which Affect the Glass Transition and Damping Capability of Polymers"; Polymers for Advanced Technologies, vol. 2; pp. 49-56; Oct. 1990.
Written Opinion of the International Searching Authority; International Application No. PCT/US2015/050098 with a filing date of Sep. 15, 2015.
Written Opinion of the International Searching Authority; International Application No. PCT/US2015/050125 with a filing date of Sep. 15, 2015.
Written Opinion of the International Searching Authority; International Application No. PCT/US2015/050133 with a filing date of Sep. 15, 2015.
Written Opinion of the International Searching Authority; International Application No. PCT/US2015/050136 with a filing date of Sep. 15, 2015.
Notification of Transmittal of the International Search Report and the Written Opinion of the International Searching Authority, or the Declaration; International Application No. PCT/US2017/031878 dated Jul. 26, 2017.

\* cited by examiner

*Primary Examiner* — Fred M Teskin
(74) *Attorney, Agent, or Firm* — Kenrick Vidale

(57) ABSTRACT

Disclosed is a method for improving vibration damping of a substrate, such as the underbody of an automobile. The method comprises applying a plastisol which comprises a polymeric component, a general purpose plasticizer and a rosin ester resin. The fused plastisol has improved damping behavior as determined using Dynamic Mechanical Thermal Analysis.

17 Claims, No Drawings

POLYMERIC COMPOSITIONS WITH IMPROVED NOISE SUPPRESSION

FIELD OF THE INVENTION

The invention relates to improving vibration damping on a substrate. More specifically, the invention relates to the use of plastisols to improve vibration damping on a substrate, such as the underbody of a vehicle. The invention also relates plastisols comprising general purpose plasticizers and resins for improving vibration damping.

BACKGROUND OF THE INVENTION

The objective of this invention is to provide improved vibration damping performance to metallic substrates. Examples of such substrates include, but are not limited to, those used for the construction of vehicles. More specifically, the objective of this invention is to provide improved vibration damping within the range of temperatures frequently encountered during driving, namely from −30° to 50° C. and most frequently from −10° C. to 40° C. Another objective of this invention is to provide improved vibration damping within this temperature range across the frequencies audible to humans, particularly in the low frequency range of 10 to 200 Hz as described in "Low Frequency Noise. What we know, what we do not know, and what we would like to know", Leventhall, Geoff, Journal of Low Frequency Noise, Vibration and Active Control 28, 2, pp. 79-104 (2009).

The reduction of noise, vibration, and harshness (often abbreviated as NVH) to humans is a goal of many industrial processes. Exposure to NVH comes from numerous sources, and can be mitigated by various means. For example, laminated safety glass can be comprised of acoustic interlayers which suppress sound transmission. Applications of such acoustic interlayers can include glass panes in commercial and residential buildings and automotive glazing. Other sources of NVH in vehicles include engine noise, road noise, springs and suspensions, braking, and chassis vibration. Noise suppression techniques include component design to reduce vibration and sound transmission; use of composite materials instead of metals; elastomeric sleeves or guards; nonwoven fabrics; carpet or other materials applied to the vehicle interior; foam; liquid-applied damping formulations; and objects produced from viscoelastic materials, such as bitumen or asphaltic pads. Although effective to varying extents depending on the source of the noise, these techniques suffer from limitations. For example, asphaltic pads cannot easily be placed and conformed to some locations on a vehicle body, require manual application, are subject to embrittlement, and must continue to adhere to the metal substrate in order to be effective. Some materials contribute undesired weight to the vehicle, contrary to weight reduction goals designed to improve fuel mileage. Materials which require high temperature and/or long times to cure can slow production, add cost, and result in higher energy usage.

One mode of NVH is through vibration. Polymeric materials can damp, or reduce oscillations of, a substrate by dissipating the oscillation energy with their viscoelastic behavior. A standard measurement of damping utilizes the Oberst method and apparatus. In this method, a material engineered to confer damping behavior is affixed to a stainless steel bar which has negligible damping itself. The effect of the damping material is deduced from the behavior of the sample bar compared to an untreated reference bar.

Damping behavior may also be measured using Dynamic Mechanical Thermal Analysis, or DMTA. In this technique, a sample is exposed to a sinusoidal force, generally over a range of temperatures or frequencies. When heated, the modulus of a viscoelastic polymeric substance varies greatly from the glassy state at low temperatures, through the glass transition to a rubbery state, and finally to a lower viscosity molten state. The ratio of the storage modulus to the loss modulus, a value known as the tan δ, is a measure of the material's ability to damp vibrations. Higher tan δ values signify more effective damping behavior. The DMTA tan δ has been shown to correlate well with the Oberst bar testing.

Plasticized polyvinyl chloride (PVC) is well known in the automotive industry. Plasticized PVC applied as a plastisol in automotive underbody coatings and sealants, after thermal curing, can protect the vehicle from chipping by stones and other materials on the road surface. Such coatings also offer protection against corrosion, for example from salted roads. These coatings are typically formulated with general purpose plasticizers and also provide a low level of reduction of the transmission of vibrations from metallic substrates. However, the performance of these plasticized PVC coatings is inadequate to confer satisfactory vibration damping across the range of temperatures and noise frequencies typically encountered without the incorporation of additional damping techniques. These performance deficiencies are exacerbated when the desire to reduce NVH to vehicle passengers over traditional levels is considered. Despite these deficiencies, the ease of application and economy of PVC plastisols make them an appealing potential solution to the reduction of NVH should performance improvements be realized. There is a need to be able to improve plasticized PVC coating damping performance using formulations comprising general purpose plasticizers.

SUMMARY OF THE INVENTION

One embodiment of the present invention is a plastisol comprising a polymeric component, a plasticizer, and a rosin ester resin. The plasticizer comprises di-2-ethylhexyl terephthalate (DENT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). The softening point of the rosin ester resin ranges from 60° C. to 96° C. The weight percent of the rosin ester resin ranges from 30 weight percent to 70 weight percent, based on the total weight of the plasticizer and the rosin ester resin.

Another embodiment of the present invention is a plastisol comprising a polymeric component, a plasticizer, and a rosin ester resin. The plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). The weight percent of the rosin ester resin ranges from 30 weight percent to 60 weight percent, based on the total weight of the plasticizer and the rosin ester resin.

Yet, another embodiment of the present invention is a method of improving vibration damping of a substrate comprising affixing a plastisol onto the substrate. The plastisol comprises a polymeric component, a plasticizer, and a rosin ester resin. The plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). The softening point of the rosin ester resin ranges from 60° C. to 96° C. The weight percent of the rosin ester resin ranges from 30 weight percent to 70 weight percent, based on the total weight of the plasticizer and the rosin ester resin.

DETAILED DESCRIPTION OF THE INVENTION

As used herein the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "affixing", as used herein, refers to providing continuous and intimate contact between the plastisol and the substrate such that the fused plastisol remains on the substrate. For example, a plastisol can be affixed to a car underbody via spray coating the plastisol onto a car underbody and subjecting the coated car underbody to conditions to fuse the plastisol. The term "adhering" as used herein, refers to using an adhesive to affix a fused plastisol sheet to a substrate.

The term "plastisol", as used herein, refers to a liquid dispersion of polymeric resin particles, optionally with other ingredients, in a plasticizer. The term "fused plastisol", as used herein, refers to the solid plastic material that is formed upon fusing the plastisol and subsequently cooling to a desired temperature. The term "fusing", as used herein, refers to heating of the plastisol to a temperature sufficient to yield a solid structure with mechanical integrity.

The term "rosin", as used herein, refers to a mixture of closely related rosin acids characterized by three fused six-carbon rings, double bonds that vary in number and location, and a single carboxylic acid group. Three sources of rosin are used for resin manufacture, gum rosin, wood rosin and tall oil rosin, all generated from the pine tree. The term "rosin ester resin", as used herein, refers to the manufactured product made by reacting rosin with an alcohol.

The term "softening point", as used herein, refers to the temperature at which a material softens as determined by a ring and ball method such as ASTM E28 or ISO 4625.

The term "substrate", as used herein, refers to the material that provides the surface onto which the plastisol is affixed.

An embodiment of the present invention is a plastisol comprising a polymeric component, a plasticizer, and a rosin ester resin. The plasticizer comprises di-2-ethylhexyl terephthalate (DENT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). The softening point of the rosin ester resin ranges from 60° C. to 96° C. The weight percent of the rosin ester resin ranges from 30 weight percent to 70 weight percent, based on the total weight of the plasticizer and the rosin ester resin.

In one aspect the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). In one aspect, the plasticizer comprises di-2-ethylhexyl terephthalate (DEHT), tri-2-ethylhexyl trimellitate (TOTM), di-2-ethylhexyl adipate (DOA). In another aspect, the plasticizer comprises di-2-ethylhexyl terephthalate (DEHT). One skilled in the art understands that often a plastisol comprises two or more plasticizers. In aspects wherein the plastisol comprises more than one plasticizer, additional plasticizers are not limited to those listed herein above.

In one aspect, the polymeric component comprises polyvinyl chloride, polyvinyl acetate, an acrylic polymer, and/or vinyl chloride-containing copolymers. In one aspect, the polymeric component comprises polyvinyl chloride and/or an acrylic polymer. In one aspect, the polymeric component comprises polyvinyl chloride and/or polyvinyl acetate. In one aspect, the polymeric component comprises polyvinyl chloride and/or vinyl chloride-containing copolymers comprising vinyl acetate. In one aspect, the polymeric component comprises polyvinyl chloride and vinyl chloride-containing copolymers comprising acrylic. In one aspect, the polymeric component comprises polyvinyl chloride.

Several rosin ester resins are commercially available. Rosin ester resin is produced by reacting the carboxylic acid group of rosin acid with various alcohols. Non-limiting example of alcohols include methanol, triethylene glycol, glycerol, and pentaerythritol. Furthermore, the rosin molecules can be hydrogenated, partially or fully.

In one aspect, rosin ester resin comprises rosin glycerol esters, hydrogenated rosin glycerol esters, rosin pentaerythritol esters, and/or hydrogenated rosin pentaerythritol esters. In one aspect, rosin ester resin comprises rosin glycerol esters and/or hydrogenated rosin glycerol esters.

In one aspect, the softening point of the rosin ester resin ranges from 60° C. to 98° C. In other examples, the softening point of the rosin ester resin ranges from 65° C. to 98° C., 70° C. to 98° C., 75° C. to 98° C., 80° C. to 98° C., 60° C. to 96° C., 65° C. to 96° C., 70° C. to 96° C., 75° C. to 96° C., 80° C. to 96° C., 60° C. to 94° C., 65° C. to 94° C., 70° C. to 94° C., 75° C. to 94° C., or 80° C. to 94° C.

In one aspect the weight percent of the rosin ester resin ranges from 30 weight percent to 70 weight percent, based on the total weight of the plasticizer and the rosin ester resin. In other examples the weight percent of the rosin ester resin ranges from 35 weight percent to 70 weight percent, 40 weight percent to 70 weight percent, 45 weight percent to 70 weight percent, 50 weight percent to 70 weight percent, 35 weight percent to 65 weight percent, 40 weight percent to 65 weight percent, 45 weight percent to 65 weight percent, 50 weight percent to 65 weight percent, 35 weight percent to 60 weight percent, 40 weight percent to 60 weight percent, 45 weight percent to 60 weight percent, or 50 weight percent to 60 weight percent, each based on the total weight of the plasticizer and the rosin ester resin.

In one aspect, the plastisol comprises a plasticizer, a rosin ester resin, a polymeric component, and other components. Examples of other components include, but are not limited to, fillers, pigments, stabilizers, foaming agents, hollow materials, elastomeric materials, rheology control additives, and adhesion promoters. The amounts of plasticizer, polymeric component, and other components can vary widely. For example, in one aspect the plastisol comprises 10 weight percent to 70 weight percent plasticizer and rosin ester resin, 10 weight percent to 70 weight percent polymeric component, and 10 weight percent to 80 weight percent other components, each based on the total weight of the plastisol. Other examples include, 15 weight percent to 60 weight percent plasticizer and rosin ester resin, 15 weight percent to 60 weight percent polymeric component, and 10 weight percent to 60 weight percent other components; or 20 weight percent to 45 weight percent plasticizer and rosin ester resin, 20 weight percent to 45 weight percent polymeric component, and 10 weight percent to 50 weight percent other components.

The viscosity of the plastisol can vary over a wide range. In one aspect, the plastisol has a viscosity ranging from 5,000 centipoise (cP) to 200,000 cP using Brookfield viscosity measurement at 23° C. In other examples, the plastisol has a viscosity ranging from 30,000 cP to 120,000 cP or from 40,000 cP to 90,000 cP.

In one aspect, the plasticizer further comprises one or more additional plasticizers. In one aspect, the additional plasticizer comprises phthalates; terephthalates; isophthalates; trimellitates; adipates; cyclohexanedicarboxylates; benzoates; phosphates; diesters of ethylene glycol, propylene glycol, their oligomers, and mixtures thereof; citrates; succinates; alkyl sulfonates; fatty acid esters and epoxidized fatty acid esters; triglycerides and epoxidized triglycerides, optionally substituted; dianhydrohexitol diesters; pentaerythritol-based tetraesters; furan-based esters; other esters; ketals; and/or polymeric plasticizers. In another aspect, the additional plasticizer comprises diisooctyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, dioctyl adipate, triethylene glycol di-2-ethylhexanoate, diethylene glycol dibenzoate, dipropylene glycol dibenzoate, and/or dibenzoates produced from mixtures of diethylene glycol and dipropylene glycol. In one aspect, the additional plasticizer comprises di-2-ethylhexyl adipate, and/or triethylene glycol di-2-ethylhexanoate.

In one aspect, the plastisol comprises fillers. Non-limiting examples of fillers include calcium carbonate, magnesium carbonate, silica, clay, mica, graphite, zinc oxide, and/or calcium oxide. In one aspect, the fillers comprise calcium carbonate.

The plastisol, in one aspect, comprises stabilizers. Non-limiting examples of stabilizers include metal soaps, epoxidized oils and epoxidized fatty acid esters, and/or organotin compounds.

In one aspect, the plastisol can be formulated or produced in a manner which incorporates more free volume into the fused plastisol. In one such technique, mechanical frothing may be applied to produce a foamed plastisol. In another aspect, a chemical foaming agent which results in a foamed structure after fusing is completed may be added. One non-limiting example of such a foaming agent is azodicarbonamide. In one aspect, a catalyst is used along with the chemical foaming agent. In another aspect, foam stabilizers are used. In another aspect, hollow materials are incorporated into the plastisol. Non-limiting examples of hollow materials include glass beads, microbeads, and/or microspheres, which can be produced from either inorganic or polymeric organic substances. In one aspect, the hollow materials are thermoplastic microspheres.

In one aspect, the plastisol comprises elastomeric materials. Non-limiting examples of elastomeric materials include nitrile-butadiene rubber, natural rubber, isoprene rubber, butadiene rubber, styrene-butadiene rubber, butyl rubber, ethylene-propylene-diene monomer (EPDM) rubber, chloroprene rubber, styrenated block copolymers, ethylene-vinyl acetate copolymers, olefinic elastomers, olefinic copolymer elastomers, silicone elastomers, polysulfide elastomers, and/or polyurethane elastomers.

In another aspect, additives to control rheology can be incorporated into the plastisols. These may include secondary plasticizers or diluents. Examples of such additives include petroleum distillates; hydrocarbon oils such as, for example, mineral oil and mineral spirits; fatty acid esters; polyphenyl oligomers, optionally partially hydrogenated; and organic solvents. Conversely, thickeners may be added to boost viscosity as desired. Materials and techniques for adjusting plastisol rheology are well known in the art.

In one aspect, the plastisol comprises adhesion promoters. Non-limiting examples of adhesion promoters include polyamidoamines, blocked isocyanates and isocyanurates, silanes, and/or epoxy resins.

In one aspect, the fused plastisol has a maximum Tan Delta (Tan $\delta_{max}$) occurring between 30° C. and 70° C. and the Tan $\delta_{max}$ ranges from 0.45 to 2.0, when measured on a sample nominally 0.6-0.7 mm thick, 3.2 mm wide, and 10-12 mm long using a Q800 Dynamic Mechanical Analyzer with a Tension Clamp at a strain of 0.1% and at a frequency of 1 Hz and a temperature ramp rate of 3° C./min.

In one aspect, maximum Tan Delta (Tan $\delta_{max}$) ranges from 0.45 to 1.8, or 0.45 to 1.6, or 0.45 to 1.4, or 0.45 to 1.2, or 0.45 to 1.0, or 0.45 to 0.8, or 0.5 to 2.0, or 0.5 to 1.8, or 0.5 to 1.6, or 0.5 to 1.4, or 0.5 to 1.2, or 0.5 to 1.0, or 0.5 to 0.8.

Another embodiment of the present invention is a plastisol comprising a polymeric component, a plasticizer, and a rosin ester resin. The plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). The weight percent of the rosin ester resin ranges from 30 weight percent to 60 weight percent, based on the total weight of the plasticizer and the rosin ester resin.

In one aspect the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). In one aspect, the plasticizer comprises di-2-ethylhexyl terephthalate (DEHT), tri-2-ethylhexyl trimellitate (TOTM), di-2-ethylhexyl adipate (DOA). In another aspect, the plasticizer comprises di-2-ethylhexyl terephthalate (DEHT). One skilled in the art understands that often a plastisol comprises two or more plasticizers. In aspects wherein the plastisol comprises more than one plasticizer, additional plasticizers are not limited to those listed herein above.

In one aspect, rosin ester resin comprises rosin glycerol esters, hydrogenated rosin glycerol esters, rosin pentaerythritol esters, and/or hydrogenated rosin pentaerythritol esters. In one aspect, rosin ester resin comprises rosin glycerol esters and/or hydrogenated rosin glycerol esters.

In one aspect, the softening point of the rosin ester resin ranges from 60° C. to 110° C. In other examples, the softening point of the rosin ester resin ranges from 65° C. to 110° C., 70° C. to 110° C., 75° C. to 110° C., 80° C. to 110° C., 60° C. to 100° C., 65° C. to 100° C., 70° C. to 100° C., 75° C. to 100° C., 80° C. to 100° C., 60° C. to 98° C., 65° C. to 98° C., 70° C. to 98° C., 75° C. to 98° C., 80° C. to 98° C., 60° C. to 96° C., 65° C. to 96° C., 70° C. to 96° C., 75° C. to 96° C., 80° C. to 96° C., 60° C. to 94° C., 65° C. to 94° C., 70° C. to 94° C., 75° C. to 94° C., or 80° C. to 94° C.

In one aspect the weight percent of the rosin ester resin ranges from 30 weight percent to 60 weight percent, based on the total weight of the plasticizer and the rosin ester resin. In other examples the weight percent of the rosin ester resin ranges from 35 weight percent to 60 weight percent, 40 weight percent to 60 weight percent, 45 weight percent to 60 weight percent, 50 weight percent to 60 weight percent, 30 weight percent to 55 weight percent, 40 weight percent to 55 weight percent, 45 weight percent to 55 weight percent, 30 weight percent to 50 weight percent, or 35 weight percent to 50 weight percent, each based on the total weight of the plasticizer and the rosin ester resin.

All of the remaining aspects of the plastisol of the above-disclosed embodiment can apply to the plastisol of the presently-disclosed embodiment. These aspects include the type of polymeric component, the amounts of plasticizer and rosin ester resin, polymeric component, and other components in the plastisol, plastisol viscosity ranges, additional plasticizers, fillers, stabilizers, foaming agents, hollow materials, elastomeric materials, rheology control additives, adhesion promoters, and ranges of maximum Tan Delta.

Yet, another embodiment of the present invention is a method of improving vibration damping of a substrate comprising affixing a plastisol onto the substrate. The plastisol comprises a polymeric component, a plasticizer, and a rosin ester resin. The plasticizer comprises di-2-ethylhexyl terephthalate (DENT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). The softening point of the rosin ester resin ranges from 60° C. to 96° C. The weight percent of the rosin ester resin ranges from 30 weight percent to 70 weight percent, based on the total weight of the plasticizer and the rosin ester resin.

In one aspect the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH). In one aspect, the plasticizer comprises di-2-ethylhexyl terephthalate (DEHT), tri-2-ethylhexyl trimellitate (TOTM), di2-ethylhexyl adipate (DOA). In another aspect, the plasticizer comprises di-2-ethylhexyl terephthalate (DEHT). One skilled in the art understands that often a plastisol comprises two or more plasticizers. In aspects wherein the plastisol comprises more than one plasticizer, additional plasticizers are not limited to those listed herein about.

In one aspect, rosin ester resin comprises rosin glycerol esters, hydrogenated rosin glycerol esters, rosin pentaerythritol esters, and/or hydrogenated rosin pentaerythritol esters. In one aspect, rosin ester resin comprises rosin glycerol esters and/or hydrogenated rosin glycerol esters.

In one aspect, the softening point of the rosin ester resin ranges from 60° C. to 98° C. In other examples, the softening point of the rosin ester resin ranges from 65° C. to 98° C., 70° C. to 98° C., 75° C. to 98° C., 80° C. to 98° C., 60° C. to 96° C., 65° C. to 96° C., 70° C. to 96° C., 75° C. to 96° C., 80° C. to 96° C., 60° C. to 94° C., 65° C. to 94° C., 70° C. to 94° C., 75° C. to 94° C., or 80° C. to 94° C.

In one aspect the weight percent of the rosin ester resin ranges from 30 weight percent to 70 weight percent, based on the total weight of the plasticizer and the rosin ester resin. In other examples the weight percent of the rosin ester resin ranges from 35 weight percent to 70 weight percent, 40 weight percent to 70 weight percent, 45 weight percent to 70 weight percent, 50 weight percent to 70 weight percent, 35 weight percent to 65 weight percent, 40 weight percent to 65 weight percent, 45 weight percent to 65 weight percent, 50 weight percent to 65 weight percent, 35 weight percent to 60 weight percent, 40 weight percent to 60 weight percent, 45 weight percent to 60 weight percent, or 50 weight percent to 60 weight percent, each based on the total weight of the plasticizer and the rosin ester resin.

All of the remaining aspects of the plastisol of the first embodiment can apply to the plastisol the second embodiment. These aspects include the type of polymeric component, the amounts of plasticizer and rosin ester resin, polymeric component, and other components in the plastisol, plastisol viscosity ranges, additional plasticizers, fillers, stabilizers, foaming agents, hollow materials, elastomeric materials, rheology control additives, adhesion promoters, and range of maximum Tan Delta.

The substrate is not particularly limited. In one aspect, the substrate is metal. In one aspect, the substrate comprises steel. In one aspect, the substrate comprises aluminum. In one aspect, the substrate is part of a wheeled vehicle. In another aspect, the substrate is on the underbody of a wheeled vehicle.

In one aspect, the method of affixing the plastisol onto the substrate comprises (a) applying the plastisol onto the substrate, (b) fusing the plastisol to produce a plastisol-covered substrate, and (c) cooling the plastisol-covered substrate to ambient temperatures. The method for applying the plastisol onto the substrate is not particularly limited. In one aspect, applying the plastisol onto the substrate comprises coating the substrate with the plastisol. Non-limiting examples of coating include spray coating and/or extrusion coating.

In one aspect, the method of affixing the plastisol to the substrate comprises (a) fusing the plastisol into a sheet and (b) adhering the sheet to the substrate.

In one aspect, the fusing occurs at a temperature ranging from 100° C. to 220° C. for a time period ranging from 1 minute to 2 hours. In another aspect, the fusing occurs at a temperature ranging from 120° C. to 180° C. for a time period ranging from 15 minutes to 40 minutes.

In one aspect, the plasticizer comprises di-2-ethylhexyl terephthalate (DENT). In one aspect, the polymeric component comprises polyvinyl chloride, polyvinyl acetate, acrylic polymers, and/or vinyl chloride-containing copolymers. In one aspect, the fused plastisol has a maximum Tan Delta (Tan $\delta_{max}$) occurring between 30° C. and 70° C., wherein the Tan $\delta_{max}$ ranges from 0.45 to 2.0, when measured on a sample nominally 0.6-0.7 mm thick, 3.2 mm wide, and 10-12 mm long using a Dynamic Mechanical Analyzer with a Tension Clamp at a strain of 0.1% and at a frequency of 1 Hz and a temperature ramp rate of 3° C./min.

Listed below are non-limiting embodiments A1-A11.

A1. A plastisol comprising a polymeric component, a plasticizer, and a rosin ester resin, wherein the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH), wherein a softening point of the rosin ester resin ranges from 60° C. to 96° C., and wherein a weight percent of the rosin ester resin ranges from 30 weight percent to 70 weight percent, based on the total weight of the plasticizer and the rosin ester resin.

A2. The plastisol of embodiment A1, wherein the plasticizer comprises di-2-ethylhexyl terephthalate (DEHT), tri-2-ethylhexyl trimellitate (TOTM), and/or di-2-ethylhexyl adipate (DOA).

A3. The plastisol of any of embodiments A1-A2, wherein the plasticizer comprises di-2-ethylhexyl terephthalate (DEHT).

A4. The plastisol of any of embodiments A1-A3, wherein the weight percent of the rosin ester resin ranges from 40 weight percent to 60 weight percent, based on the total weight of the plasticizer and the rosin ester resin.

A5. The plastisol of any of embodiments A1-A4, comprising 10 weight percent to 70 weight percent of the plasticizer and rosin ester resin, 10 weight percent to 70 weight percent of said polymeric component, and 10 weight percent to 80 weight percent of other components, each based on the total weight of said plastisol, and wherein said other components comprise fillers, pigments, stabilizers, foaming agents, hollow materials, elastomeric materials, rheology control additives, or adhesion promoters.

A6. The plastisol of any of embodiments A1-A5, wherein the polymeric component comprises polyvinyl chloride, polyvinyl acetate, acrylic polymers, and/or vinyl chloride-containing copolymers.

A7. The plastisol of any of embodiments A1-A6, wherein the softening point of the rosin ester resin ranges from 60° C. to 96° C.

A8. The plastisol of any of embodiments A5-A7, wherein the fillers comprise calcium carbonate, magnesium carbonate, silica, clay, mica, graphite, zinc oxide, and/or calcium oxide; or the fillers comprise calcium carbonate.

A9. The plastisol of any of embodiments A5-A8, wherein the rheology control additives comprise petroleum distillates; mineral oil and mineral spirits; fatty acid esters; polyphenyl oligomers; and organic solvents.

A10. The plastisol of any of embodiments A1-A9, wherein the fused plastisol has a maximum Tan Delta (Tan δmax) occurring between 30° C. and 70° C. and wherein the Tan δmax ranges from 0.45 to 2.0, when measured on a sample nominally 0.6-0.7 mm thick, 3.2 mm wide, and 10-12 mm long using a Dynamic Mechanical Analyzer with a Tension Clamp at a strain of 0.1% and at a frequency of 1 Hz and a temperature ramp rate of 3° C./min.

A11. The plastisol of any of embodiments A1-A10, wherein the rosin ester resin comprises glycerol esters, hydrogenated glycerol esters, pentaerythritol esters, and/or hydrogenated pentaerythritol esters.

Listed below are non-limiting embodiments B1-B6.

B1. A method of improving vibration damping of a substrate comprising affixing a plastisol of any of embodiments A1-A11 onto the substrate.

B2. The method of embodiment B1, wherein the affixing comprises (a) applying the plastisol onto the substrate; (b) fusing the plastisol to produce a plastisol-covered substrate; and (c) cooling the plastisol-covered substrate to ambient temperatures.

B3. The method of any of embodiments B1-B2, wherein the applying of the plastisol onto the substrate comprises coating the substrate with the plastisol.

B4. The method of embodiment B1, wherein the affixing comprises (a) fusing the plastisol into a sheet; and (b) adhering the sheet to the substrate.

B5. The method of any of embodiments B2-B4, wherein the fusing occurs at a temperature range from 100° C. to 220° C. for a time period ranging from 1 minute to 2 hours.

B6. The method of any of embodiments B1-B5, wherein the substrate is part of a wheeled vehicle.

EXAMPLES

Eastman 168™ Non-Phthalate Plasticizer (di-2-ethylhexyl terephthalate (DENT)), Eastman™ DOA Plasticizer (di-2-ethylhexyl adipate (DOA)), Eastman™ TOTM Plasticizer (tri-2-ethylhexyl trimellitate (TOTM), and Eastman™ DOP Plasticizer (di-2-ethylhexyl phthalate (DOP)) are commercially available (Eastman Chemical Company, Kingsport, Tenn.) and were used without further processing. Other general purpose plasticizers, di-2-propylheptyl phthalate (DPHP), diisononyl phthalate (DINP), diisodecyl phthalate (DIDP) and diisononyl 1,2-cyclohexanedicarboxylate (DINCH) are commercially available and were used without further processing. The resins listed in Table 1 are commercially available and were used without further processing. All other ingredients used in the plastisols hereafter described are commercially available and were used without further processing.

The resins used in the examples are listed in Table 1.

TABLE 1

Resins chemical types, softening points taken from published typical values, and trade names

| Resin ID | Chemical type | Softening point, ° C. | Trade names |
| --- | --- | --- | --- |
| Resin R1 | Glycerol ester of rosin | 94 | Eastman ™ Ester Gum 8D |
| Resin R2 | Glycerol ester of rosin | 88 | Permalyn ™ 5095 |
| Resin R3 | Glycerol ester of rosin | 84 | Eastman ™ Ester Gum 8L-M |
| Resin R4 | Pentaerythritol ester of rosin | 100 | Permalyn ™ 5110 |
| Resin R5 | hydrogenated glycerol ester of rosin | 85 | Foral ™ 85E |
| Resin R6 | hydrogenated pentaerythritol ester of rosin | 101 | Foral ™ 105E |
| Resin R7 | Methyl ester of rosin | <20 | Abalyn ™ D-E |
| Resin P1 | Pure monomer resin | 100 | Kristalex ™ 3100 |
| Resin P2 | Pure monomer resin | 98 | Piccotex ™ 100 |
| Resin P3 | Pure monomer resin | 75 | Piccotex ™ 75 |
| Resin P4 | Pure monomer resin | 70 | Kristalex ™ 3070 |
| Resin H1 | C5 hydrocarbon resin | 94 | Piccotac ™ 1095 |
| Resin H2 | Aromatic-modified C5 hydrocarbon resin | 95 | Piccotac ™ 3095E |
| Resin H3 | Aromatic-modified C5 hydrocarbon resin | 95 | Piccotac ™ 8595 |
| Resin H4 | Aromatic-modified C5 hydrocarbon resin | 91 | Piccotac ™ 7590-N |
| Resin H5 | Aromatic-modified C5 hydrocarbon resin | 50 | Piccotac ™ 7050 |
| Resin H6 | partially hydrogenated C9 resin | 100 | Regalite ™ S5100 |
| Resin H7 | partially hydrogenated, aromatic-modified aliphatic resin | 100 | Regalite ™ C6100 |

General Procedure for Making Plasticizer/Resin Blend

For a 50:50 plasticizer:resin blend—to a 0.25 liter jar 50 grams of the chosen plasticizer and 50 grams of resin were added and placed in an air-circulating oven that was set at a temperature approximately 10-15° C. above the softening point of the resin. The sample was checked periodically and stirred. The sample was taken out of the oven after the mixture was sufficiently blended; total blending times were approximately 24-48 hours. The mixture was allowed to cool to room temperature before use.

For a 30:70 plasticizer:resin blend—to a 0.25 liter jar 30 grams of the chosen plasticizer and 70 grams of the chosen resin were added and placed in an air-circulating oven that was set at a temperature approximately 10-15° C. above the softening point of the resin. The sample was checked periodically and stirred. The sample was taken out of the oven after the mixture was sufficiently blended after a total blending time of approximately 24-48 hours. The mixture was allowed to cool to room temperature before use.

Preparation of PVC Formulations and Samples for DMTA Evaluation

Example 1

A FlackTek SpeedMixer™ model 150FV was used to prepare PVC plastisols. To a mixing cup was added 10 grams Geon™ 121A PVC paste resin, 4 grams Geon™ 217 PVC blending resin, 6 grams UltraPflex™ precipitated calcium carbonate, 3.0 grams Varsol™ 18 Non-dearomatized Fluid, and 11.0 g of an Eastman 168™ Plasticizer/Eastman™ Ester Gum 8D 1:1 blend. The contents were shaken in the mixer for 45 seconds and the side of the container was scraped. This process was repeated twice to ensure complete dispersion. The resulting plastisol was then deaerated in a desiccator to which vacuum was applied for 20 minutes.

Samples for DMTA analysis were prepared by drawdowns of the deaerated plastisols onto release paper at a 25 mil thickness, then fused at 320° F. for 25 minutes. Dynamic Mechanical Thermal Analysis (DMTA) measurements were performed on these samples using a tension clamp on a DMA Q800 from TA Instruments. Samples were cut using a ⅛ inch precision cutter, and sample width and thickness were recorded into the software. After loading the sample into the tension clamps, the software measured and recorded sample length. A 0.1% strain was placed on the sample at a 1 Hz frequency. The sample was then cooled with liquid nitrogen to −100° C. Once the temperature equilibrated, the sample was heated at a 3° C. per minute rate until a maximum of 100° C. was reached. Storage modulus, loss modulus, and tan δ results were recorded. Tan δ results at temperatures from −30° C. to 80° C., in 10° C. increments, are given in Table 2.

Examples 2-8 and Comparative Examples C1-C8

Example 1 was repeated, using the amount of Eastman 168™ Plasticizer and Varsol rheology control additive as well as the type and amount of resin as indicated in Table 2. Comparative examples C1 and C2 used no resin. When the amount of plasticizer was greater than 50 wt. %, based on the total amount of plasticizer and resin (Comparative Examples C3-C8), the equal amount of plasticizer/resin blend and the required additional plasticizer to meet the total amount of plasticizer was added to the plastisol. The correspondent tan δ results are given in Table 2. Comparative Examples 1 and 2, plastisols with no resin, show a maximum Tan Delta (Tan $\delta_{max}$) of 0.36 and 0.40, respectively. Examples 1-8, plastisols with 50 wt. % resin, based on the total amount of plasticizer and rosin ester resin, show an improved Tan $\delta_{max}$ from 0.49 to 0.68. Comparative Examples C3-C8, plastisols with 25 wt. % resin, based on the total amount of plasticizer and resin, show a Tan $\delta_{max}$ range from 0.37 to 0.45.

TABLE 2

Plastisols: 10 parts Geon ™ 121A, 4 parts Geon ™ 217, 6 parts UltraPflex ™ precipitated calcium carbonate, 0.4 parts calcium oxide, 0.2 parts zinc oxide, plasticizers and Varsol ™ 18 rheology control additive and optionally resin, as noted

| | | C1(a) | C2 | 1(a) | 2 | 3 | 4 | 5 | 6(a) | 7 | 8 | C3 | C4 | C5 | C6 | C7 | C8 |
|---|---|---|---|---|---|---|---|---|---|---|---|---|---|---|---|---|---|
| Eastman 168 ™ Plasticizer, grams | | 8 | 6 | 5.5 | 5.5 | 5.5 | 5.5 | 5.5 | 5.5 | 5.5 | 5.5 | 8.25 | 8.25 | 8.25 | 8.25 | 8.25 | 8.25 |
| Resin type | | | | R1 | R1 | R2 | R2 | R3 | R4 | R5 | R6 | R1 | R2 | R3 | R4 | R5 | R6 |
| Resin grams | | 0 | 0 | 5.5 | 5.5 | 5.5 | 5.5 | 5.5 | 5.5 | 5.5 | 5.5 | 2.75 | 2.75 | 2.75 | 2.75 | 2.75 | 2.75 |
| Varsol 18 fluid, grams | | 2 | 3 | 3 | 2.5 | 3 | 2.5 | 3 | 3 | 3 | 3 | 2 | 2 | 2 | 2 | 2 | 2 |
| DMTA tan delta height | at −30° C. | 0.09 | 0.07 | 0.08 | 0.03 | 0.07 | 0.05 | 0.06 | 0.06 | 0.10 | 0.05 | 0.13 | 0.09 | 0.12 | 0.10 | 0.11 | 0.11 |
| | at −20° C. | 0.13 | 0.09 | 0.12 | 0.06 | 0.10 | 0.07 | 0.10 | 0.10 | 0.14 | 0.08 | 0.17 | 0.14 | 0.17 | 0.15 | 0.16 | 0.16 |
| | at −10° C. | 0.17 | 0.11 | 0.16 | 0.10 | 0.13 | 0.11 | 0.14 | 0.15 | 0.15 | 0.14 | 0.22 | 0.19 | 0.22 | 0.20 | 0.20 | 0.20 |
| | at 0° C. | 0.21 | 0.14 | 0.18 | 0.14 | 0.18 | 0.15 | 0.17 | 0.18 | 0.16 | 0.17 | 0.27 | 0.25 | 0.27 | 0.24 | 0.24 | 0.23 |
| | at 10° C. | 0.26 | 0.17 | 0.22 | 0.18 | 0.22 | 0.19 | 0.21 | 0.18 | 0.18 | 0.17 | 0.32 | 0.31 | 0.32 | 0.28 | 0.28 | 0.26 |
| | at 20° C. | 0.31 | 0.22 | 0.27 | 0.22 | 0.27 | 0.24 | 0.26 | 0.20 | 0.21 | 0.18 | 0.38 | 0.39 | 0.38 | 0.33 | 0.33 | 0.31 |
| | at 30° C. | 0.36 | 0.28 | 0.33 | 0.28 | 0.34 | 0.31 | 0.32 | 0.24 | 0.25 | 0.20 | 0.41 | 0.45 | 0.43 | 0.39 | 0.37 | 0.36 |
| | at 40° C. | 0.36 | 0.35 | 0.41 | 0.36 | 0.44 | 0.42 | 0.39 | 0.30 | 0.30 | 0.24 | 0.37 | 0.44 | 0.40 | 0.41 | 0.37 | 0.39 |
| | at 50° C. | 0.29 | 0.40 | 0.52 | 0.52 | 0.56 | 0.57 | 0.49 | 0.43 | 0.39 | 0.36 | 0.28 | 0.32 | 0.29 | 0.36 | 0.31 | 0.36 |
| | at 60° C. | 0.20 | 0.33 | 0.51 | 0.63 | 0.50 | 0.58 | 0.49 | 0.67 | 0.57 | 0.68 | 0.19 | 0.20 | 0.19 | 0.25 | 0.22 | 0.26 |
| | at 70° C. | 0.13 | 0.20 | 0.28 | 0.39 | 0.26 | 0.36 | 0.28 | 0.46 | 0.38 | 0.58 | 0.12 | 0.12 | 0.12 | 0.15 | 0.14 | 0.15 |
| | at 80° C. | 0.09 | 0.13 | 0.13 | 0.20 | 0.13 | 0.18 | 0.14 | 0.19 | 0.18 | 0.25 | 0.07 | 0.07 | 0.08 | 0.09 | 0.09 | 0.09 |
| Dual tan delta peaks? | | No | No | No | No | No | No | No | No | No | No | No | No | No | No | No | No |
| Exudation on film after fusion?** | | 0 | 0 | 0 | 0 | 0 | 0 | 0 | 0 | 1 | 0 | 0 | 0 | 0 | 0 | 0 | 0 |

**0 = no, 1 = slight, 2 = some, 3 = much, 4 = excessive

Comparative Examples C9-C18

Example 1 was repeated, using the amount of Eastman 168™ Plasticizer and Varsol rheology control additive as well as the type and amount of resin as indicated in Table 3. Comparative Examples C1 and C2 used no resin. When the amount of plasticizer was greater than 50 wt. %, based on the total amount of plasticizer and resin (Comparative Examples C14-C18), the equal amount of plasticizer/resin blend and the required additional plasticizer to meet the total amount of plasticizer was added to the plastisol. The correspondent tan δ results are given in Table 3. Comparative Example C9, a plastisol with 50 wt. % of the rosin ester resin with a softening point less than 20° C. does not show an improvement in the Tan $\delta_{max}$. Comparative Examples C10-C13, plastisols with 50 wt. % of a pure monomer resin, P1-P4, did show improvements in Tan $\delta_{max}$ with Tan $\delta_{max}$ ranging from 0.62 to 0.72. These plastisols, however, each show a dual Tan δ peak which indicates incompatibility of the components of the plastisol. Comparative Examples C14-C18, plastisols with 25 wt. % resin, based on the total amount of resin and plasticizer, show a Tan $\delta_{max}$ range from 0.38 to 0.42.

TABLE 3

Plastisols: 10 parts Geon ™ 121A, 4 parts Geon ™ 217, 6 parts UltraPflex ™ precipitated calcium carbonate, 0.4 parts calcium oxide, 0.2 parts zinc oxide, plasticizers and Varsol ™ 18 rheology control additive and optionally resin, as noted

|  |  | Example | | | | | | | | | | | |
|---|---|---|---|---|---|---|---|---|---|---|---|---|---|
|  |  | C1(a) | C2 | C9 | C10 | C11 | C12 | C13 | C14 | C15 | C16 | C17 | C18 |
| Eastman 168 ™ Plasticizer, grams | | 8 | 6 | 5.5 | 5.5 | 5.5 | 5.5 | 5.5 | 8.25 | 8.25 | 8.25 | 8.25 | 8.25 |
| Resin type | | | | R7 | P1 | P2 | P3 | P4 | R7 | P1 | P2 | P3 | P4 |
| Resin grams | | 0 | 0 | 5.5 | 5.5 | 5.5 | 5.5 | 5.5 | 2.75 | 2.75 | 2.75 | 2.75 | 2.75 |
| Varsol 18 fluid, grams | | 2 | 3 | 1 | 3 | 3 | 3 | 3 | 0 | 2 | 2 | 2 | 2 |
| DMTA tan delta height | at −30° C. | 0.09 | 0.07 | 0.09 | 0.12 | 0.06 | 0.07 | 0.06 | 0.11 | 0.17 | 0.13 | 0.11 | 0.11 |
| | at −20° C. | 0.13 | 0.09 | 0.13 | 0.19 | 0.09 | 0.13 | 0.11 | 0.17 | 0.21 | 0.17 | 0.15 | 0.17 |
| | at −10° C. | 0.17 | 0.11 | 0.19 | 0.26 | 0.14 | 0.23 | 0.18 | 0.24 | 0.23 | 0.18 | 0.17 | 0.22 |
| | at 0° C. | 0.21 | 0.14 | 0.24 | 0.24 | 0.24 | 0.24 | 0.18 | 0.30 | 0.24 | 0.20 | 0.20 | 0.26 |
| | at 10° C. | 0.26 | 0.17 | 0.30 | 0.18 | 0.31 | 0.17 | 0.14 | 0.36 | 0.27 | 0.24 | 0.25 | 0.30 |
| | at 20° C. | 0.31 | 0.22 | 0.35 | 0.17 | 0.27 | 0.15 | 0.15 | 0.41 | 0.31 | 0.30 | 0.30 | 0.36 |
| | at 30° C. | 0.36 | 0.28 | 0.39 | 0.19 | 0.24 | 0.17 | 0.19 | 0.42 | 0.36 | 0.37 | 0.37 | 0.42 |
| | at 40° C. | 0.36 | 0.35 | 0.40 | 0.23 | 0.25 | 0.22 | 0.26 | 0.34 | 0.38 | 0.42 | 0.41 | 0.42 |
| | at 50° C. | 0.29 | 0.40 | 0.35 | 0.31 | 0.34 | 0.33 | 0.44 | 0.22 | 0.36 | 0.41 | 0.39 | 0.34 |
| | at 60° C. | 0.20 | 0.33 | 0.21 | 0.57 | 0.64 | 0.65 | 0.72 | 0.14 | 0.28 | 0.30 | 0.28 | 0.21 |
| | at 70° C. | 0.13 | 0.20 | 0.12 | 0.62 | 0.61 | 0.65 | 0.53 | 0.10 | 0.16 | 0.17 | 0.15 | 0.11 |
| | at 80° C. | 0.09 | 0.13 | 0.08 | 0.30 | 0.27 | 0.29 | 0.22 | 0.06 | 0.10 | 0.09 | 0.08 | 0.06 |
| Dual tan delta peaks? | | No | No | No | Yes | Yes | Yes | Yes | No | No | No | No | No |
| Exudation on film after fusion?** | | 0 | 0 | 0 | 0 | 0 | 0 | 0 | 0 | 1 | 1 | 3 | 1 |

**0 = no, 1 = slight, 2 = some, 3 = much, 4 = excessive

Comparative Examples C19-C32

Example 1 was repeated, using the amount of Eastman 168™ Plasticizer and Varsol rheology control additive as well as the type and amount of resin as indicated in Table 4. Comparative Examples C1 and C2 used no resin. When the amount of plasticizer was greater than 50% (Comparative Examples C26-C32), the equal amount of plasticizer/resin blend and the required additional plasticizer to meet the total amount of plasticizer was added to the plastisol. The correspondent Tan δ results are given in Table 4. Comparative Examples C19-C25, plastisols with 50 wt. % of a hydrocarbon resin, H1-H7 did show improvements in Tan $\delta_{max}$ with Tan $\delta_{max}$ ranging from 0.66 to 0.80. These plastisols, however, each show a duel Tan δ peak which indicates incompatibility of the components of the plastisol. Comparative Examples C26-C32, plastisols with 25 wt. % Hydrocarbon resin, based on the total amount of resin and plasticizer, show a Tan $\delta_{max}$ range from 0.39 to 0.47 with comparative examples C25, C26, and C28-C32 having a dual Tan δ peak which indicates incompatibility of the components of the plastisol.

TABLE 4

Plastisols: 10 parts Geon ™ 121A, 4 parts Geon ™ 217, 6 parts UltraPflex ™ precipitated calcium carbonate, 0.4 parts calcium oxide, 0.2 parts zinc oxide, plasticizers and Varsol ™ 18 rheology control additive and optionally resin, as noted

|  |  | Example | | | | | | | | | | | | | | | |
|---|---|---|---|---|---|---|---|---|---|---|---|---|---|---|---|---|---|
|  |  | C1(a) | C2 | C19 | C20 | C21 | C22 | C23 | C24 | C25 | C26 | C27 | C28 | C29 | C30 | C31 | C32 |
| Eastman 168 ™ Plasticizer, grams | | 8 | 6 | 5.5 | 5.5 | 5.5 | 5.5 | 5.5 | 5.5 | 5.5 | 8.25 | 8.25 | 8.25 | 8.25 | 8.25 | 8.25 | 8.25 |
| Resin type | | | | H1 | H2 | H3 | H4 | H5 | H6 | H7 | H1 | H2 | H3 | H4 | H5 | H6 | H7 |
| Resin grams | | 0 | 0 | 5.5 | 5.5 | 5.5 | 5.5 | 5.5 | 5.5 | 5.5 | 2.75 | 2.75 | 2.75 | 2.75 | 2.75 | 2.75 | 2.75 |
| Varsol 18 fluid, grams | | 2 | 3 | 3 | 3 | 3 | 3 | 2 | 3 | 3 | 2 | 2 | 2 | 2 | 1 | 2 | 2 |
| DMTA tan delta height | at −30° C. | 0.09 | 0.07 | 0.10 | 0.07 | 0.09 | 0.08 | 0.20 | 0.10 | 0.05 | 0.16 | 0.14 | 0.16 | 0.15 | 0.14 | 0.12 | 0.13 |
| | at −20° C. | 0.13 | 0.09 | 0.17 | 0.12 | 0.16 | 0.14 | 0.32 | 0.18 | 0.10 | 0.14 | 0.17 | 0.15 | 0.13 | 0.11 | 0.16 | 0.15 |
| | at −10° C. | 0.17 | 0.11 | 0.32 | 0.19 | 0.30 | 0.24 | 0.20 | 0.26 | 0.17 | 0.14 | 0.19 | 0.14 | 0.12 | 0.11 | 0.18 | 0.15 |
| | at 0° C. | 0.21 | 0.14 | 0.37 | 0.20 | 0.35 | 0.29 | 0.12 | 0.22 | 0.27 | 0.17 | 0.22 | 0.16 | 0.14 | 0.14 | 0.21 | 0.17 |
| | at 10° C. | 0.26 | 0.17 | 0.27 | 0.15 | 0.24 | 0.20 | 0.11 | 0.15 | 0.24 | 0.21 | 0.26 | 0.20 | 0.17 | 0.18 | 0.24 | 0.21 |
| | at 20° C. | 0.31 | 0.22 | 0.23 | 0.14 | 0.17 | 0.14 | 0.11 | 0.12 | 0.19 | 0.25 | 0.30 | 0.25 | 0.21 | 0.23 | 0.28 | 0.25 |
| | at 30° C. | 0.36 | 0.28 | 0.24 | 0.15 | 0.16 | 0.13 | 0.13 | 0.13 | 0.18 | 0.30 | 0.35 | 0.31 | 0.27 | 0.29 | 0.34 | 0.31 |
| | at 40° C. | 0.36 | 0.35 | 0.26 | 0.19 | 0.18 | 0.16 | 0.16 | 0.17 | 0.22 | 0.35 | 0.39 | 0.38 | 0.35 | 0.36 | 0.40 | 0.38 |
| | at 50° C. | 0.29 | 0.40 | 0.34 | 0.30 | 0.26 | 0.21 | 0.26 | 0.27 | 0.38 | 0.43 | 0.38 | 0.47 | 0.47 | 0.46 | 0.42 | 0.45 |
| | at 60° C. | 0.20 | 0.33 | 0.61 | 0.65 | 0.54 | 0.44 | 0.54 | 0.59 | 0.68 | 0.43 | 0.30 | 0.39 | 0.47 | 0.47 | 0.32 | 0.39 |
| | at 70° C. | 0.13 | 0.20 | 0.71 | 0.66 | 0.76 | 0.75 | 0.80 | 0.73 | 0.65 | 0.24 | 0.17 | 0.20 | 0.26 | 0.27 | 0.17 | 0.21 |
| | at 80° C. | 0.09 | 0.13 | 0.30 | 0.28 | 0.38 | 0.62 | 0.42 | 0.34 | 0.24 | 0.13 | 0.10 | 0.10 | 0.13 | 0.13 | 0.08 | 0.11 |
| Dual tan delta peaks? | | No | No | Yes | Yes | Yes | Yes | Yes | Yes | Yes | No | Yes | Yes | Yes | Yes | No | No |
| Exudation on film after fusion?** | | 0 | 0 | 0 | 0 | 0 | 0 | 1 | 0 | 2 | 1 | 3 | 3 | 4 | 3 | 3 | 3 |

**0 = no, 1 = slight, 2 = some, 3 = much, 4 = excessive

Examples 9-19 and Comparative Examples C33-C38

Example 1 was repeated using various general purpose plasticizers in place of the Eastman 168™ Plasticizer. The plasticizer, amount of Varsol™ 18 Non-dearomatized Fluid, and resins are noted in Table 5. For all of the plastisols comprising the general purpose plasticizers tested, the plastisol comprising the plasticizer and resin had a higher Tan $\delta_{max}$ than the plastisol comprising only the plasticizer.

TABLE 5

Plastisols: 10 parts Geon™ 121A, 4 parts Geon™ 217, 6 parts UltraPflex™ precipitated calcium carbonate, 0.4 parts calcium oxide, 0.2 parts zinc oxide, plasticizers and Varsol™ 18 rheology control additive and optionally resin, as noted −5.5 g resin and 5.5 g plasticizer or 0 g resin and 8.0 g plasticizer

| | | C33 | 9 | 10 | C34 | 11 | 12 | C35 | 13 | 14 | C36 | 15 | C37 | 16 | 17 | C38 | 18 | 19 |
|---|---|---|---|---|---|---|---|---|---|---|---|---|---|---|---|---|---|---|
| Plasticizer | | DOA | | | DINP | | | DINCH | | | TOTM | | DPHP | | | DOP | | |
| Resin type | | Na | R1 | R4 | Na | R1 | R4 | Na | R1 | R4 | Na | R1 | Na | R1 | R4 | Na | R1 | R4 |
| Varsol 18 fluid, grams | | 2 | 3 | 3 | 2 | 3 | 3 | 2 | 3 | 3 | 2 | 3 | 2 | 3 | 3 | 2 | 3 | 3 |
| DMTA tan delta height | at −30° C. | 0.15 | 0.06 | 0.07 | 0.09 | 0.05 | 0.04 | 0.13 | 0.06 | 0.07 | 0.08 | 0.06 | 0.11 | 0.06 | 0.05 | 0.09 | 0.05 | 0.06 |
| | at −20° C. | 0.16 | 0.08 | 0.10 | 0.14 | 0.07 | 0.06 | 0.17 | 0.08 | 0.11 | 0.11 | 0.09 | 0.16 | 0.08 | 0.06 | 0.14 | 0.07 | 0.07 |
| | at −10° C. | 0.18 | 0.12 | 0.14 | 0.18 | 0.11 | 0.09 | 0.19 | 0.12 | 0.17 | 0.16 | 0.13 | 0.19 | 0.12 | 0.09 | 0.19 | 0.09 | 0.10 |
| | at 0° C. | 0.21 | 0.16 | 0.18 | 0.23 | 0.17 | 0.15 | 0.21 | 0.17 | 0.21 | 0.21 | 0.18 | 0.22 | 0.18 | 0.13 | 0.24 | 0.13 | 0.14 |
| | at 10° C. | 0.24 | 0.20 | 0.21 | 0.28 | 0.23 | 0.21 | 0.24 | 0.21 | 0.22 | 0.26 | 0.23 | 0.25 | 0.23 | 0.19 | 0.29 | 0.20 | 0.20 |
| | at 20° C. | 0.26 | 0.24 | 0.23 | 0.32 | 0.29 | 0.27 | 0.27 | 0.26 | 0.23 | 0.31 | 0.28 | 0.28 | 0.27 | 0.25 | 0.34 | 0.26 | 0.24 |
| | at 30° C. | 0.28 | 0.27 | 0.25 | 0.36 | 0.36 | 0.32 | 0.29 | 0.31 | 0.24 | 0.35 | 0.34 | 0.31 | 0.32 | 0.30 | 0.36 | 0.29 | 0.28 |
| | at 40° C. | 0.26 | 0.30 | 0.29 | 0.34 | 0.44 | 0.40 | 0.30 | 0.39 | 0.28 | 0.36 | 0.43 | 0.32 | 0.38 | 0.35 | 0.34 | 0.31 | 0.31 |
| | at 50° C. | 0.22 | 0.37 | 0.37 | 0.27 | 0.54 | 0.52 | 0.29 | 0.51 | 0.36 | 0.33 | 0.51 | 0.30 | 0.48 | 0.46 | 0.26 | 0.36 | 0.36 |
| | at 60° C. | 0.17 | 0.48 | 0.56 | 0.20 | 0.46 | 0.60 | 0.24 | 0.56 | 0.57 | 0.25 | 0.48 | 0.24 | .053 | 0.62 | 0.18 | 0.56 | 0.51 |
| | at 70° C. | 0.12 | 0.35 | 0.51 | 0.14 | 0.25 | 0.36 | 0.16 | 0.34 | 0.56 | 0.17 | 0.29 | 0.16 | 0.31 | 0.46 | 0.13 | 0.34 | 0.51 |
| | at 80° C. | 0.09 | 0.20 | 0.23 | 0.10 | 0.14 | 0.16 | 0.11 | 0.18 | 0.28 | 0.12 | 0.15 | 0.11 | 0.18 | .020 | 0.09 | 0.18 | 0.30 |
| Dual tan delta peaks? | | No | No | No | No | No | No | No | No | No | No | No | No | No | No | No | No | No |
| Exudation on film after fusion?** | | 0 | 0 | 0 | 0 | 0 | 0 | 0 | 0 | 0 | 0 | 0 | 0 | 0 | 0 | 0 | 0 | 0 |

**0 = no, 1 = slight, 2 = some, 3 = much, 4 = excessive

Examples 1(b), 20-22 and Comparative Examples C1(b) and C39

Example 1 was repeated with the amount of Eastman 168™ Plasticizer and rosin ester resin as given in Table 6. Examples, 20, 1(b), and 21 show an increase in Tan $\delta_{max}$ over a rosin glyceryl ester range of 30 wt % ester rosin resin to a 70 wt %, based on a total plasticizer and resin basis while maintaining compatibility. Examples 22, 6(b), and C39 also show an increase in Tan $\delta_{max}$ over a rosin pentaerythritol ester resin range of 30 wt % rosin ester to 70 wt %, based on a total rosin ester plus plasticizer basis. At the 70 wt % rosin pentaerythritol ester resin Comparative Example C39, dual Tan $\delta_{max}$ occur at 20° C. and 70° indicating incompatibility.

TABLE 6

Plastisols: 10 parts Geon™ 121A, 4 parts Geon™ 217, 6 parts UltraPflex™ precipitated calcium carbonate, 0.4 parts calcium oxide, 0.2 parts zinc oxide, plasticizers and Varsol™ 18 rheology control additive and optionally resin, as noted

| | | C1(b) | 20 | 1(b) | 21 | 22 | 6(b) | C39 |
|---|---|---|---|---|---|---|---|---|
| Eastman 168™ Plasticizer, grams | | 8 | 7.7 | 5.5 | 5.5 | 7.7 | 5.5 | 5.5 |
| Resin | | | R1 | R1 | R1 | R4 | R4 | R4 |
| Resin grams | | 0 | 3.3 | 5.5 | 12.83 | 3.3 | 5.5 | 12.83 |
| Varsol 18 fluid, grams | | 2 | 2 | 3 | 4 | 2 | 3 | 4 |
| DMTA tan delta height | at −30° C. | 0.12 | 0.07 | 0.07 | 0.04 | 0.07 | 0.04 | 0.04 |
| | at −20° C. | 0.14 | 0.11 | 0.10 | 0.05 | 0.11 | 0.07 | 0.06 |
| | at −10° C. | 0.17 | 0.17 | 0.13 | 0.08 | 0.16 | 0.11 | 0.10 |
| | at 0° C. | 0.21 | 0.23 | 0.17 | 0.15 | 0.21 | 0.16 | 0.21 |
| | at 10° C. | 0.25 | 0.29 | 0.21 | 0.24 | 0.25 | 0.18 | 0.37 |
| | at 20° C. | 0.30 | 0.37 | 0.25 | 0.28 | 0.31 | 0.18 | 0.42 |
| | at 30° C. | 0.36 | 0.46 | 0.32 | 0.33 | 0.38 | 0.20 | 0.35 |
| | at 40° C. | 0.37 | 0.48 | 0.42 | 0.45 | 0.46 | 0.25 | 0.24 |
| | at 50° C. | 0.30 | 0.36 | 0.56 | 0.74 | 0.46 | 0.41 | 0.24 |
| | at 60° C. | 0.21 | 0.22 | 0.55 | 0.90 | 0.32 | 0.74 | 0.46 |
| | at 70° C. | 0.14 | 0.12 | 0.29 | 0.47 | 0.17 | 0.61 | 0.85 |

TABLE 6-continued

Plastisols: 10 parts Geon ™ 121A, 4 parts Geon ™ 217, 6 parts UltraPflex ™ precipitated calcium carbonate, 0.4 parts calcium oxide, 0.2 parts zinc oxide, plasticizers and Varsol ™ 18 rheology control additive and optionally resin, as noted

| | Example | | | | | | |
|---|---|---|---|---|---|---|---|
| | C1(b) | 20 | 1(b) | 21 | 22 | 6(b) | C39 |
| at 80° C. | 0.10 | 0.06 | 0.15 | 0.06 | 0.08 | 0.23 | 0.46 |
| Dual tan delta peaks? | No | No | No | No | No | No | Yes |
| Exudation on film after fusion?** | 0 | 0 | 0 | 0 | 0 | 0 | 0 |

**0 = no, 1 = slight, 2 = some, 3 = much, 4 = excessive

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following.

We claim:

1. A plastisol comprising a polymeric component, a plasticizer, and a rosin ester resin,
   wherein the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH);
   wherein a softening point of the rosin ester resin ranges from 60° C. to 96° C.;
   wherein a weight percent of the rosin ester resin ranges from 30 weight percent to 70 weight percent, based on the total weight of the plasticizer and the rosin ester resin; and
   wherein the fused plastisol has a maximum Tan Delta (Tan δmax) occurring between 30° C. and 70° C. and wherein the Tan δmax ranges from 0.45 to 2.0, when measured on a sample nominally 0.6-0.7 mm thick, 3.2 mm wide, and 10-12 mm long using a Dynamic Mechanical Analyzer with a Tension Clamp at a strain of 0.1% and at a frequency of 1Hz and a temperature ramp rate of 3° C/min.

2. The plastisol of claim 1, wherein the plasticizer comprises di-2-ethylhexyl terephthalate (DEHT), tri-2-ethylhexyl trimellitate (TOTM), and/or di-2-ethylhexyl adipate (DOA).

3. The plastisol of claim 1, wherein the weight percent of the rosin ester resin ranges from 40 weight percent to 60 weight percent, based on the total weight of the plasticizer and the rosin ester resin.

4. The plastisol according to claim 1, comprising 10 weight percent to 70 weight percent of the plasticizer and the rosin ester resin, 10 weight percent to 70 weight percent of said polymeric component, and 10 weight percent to 80 weight percent of other components, each based on the total weight of said plastisol, and
   wherein said other components comprise fillers, pigments, stabilizers, foaming agents, hollow materials, elastomeric materials, rheology control additives, or adhesion promoters.

5. The plastisol according to claim 1, wherein the polymeric component comprises polyvinyl chloride, polyvinyl acetate, acrylic polymers, and/or vinyl chloride-containing copolymers.

6. The plastisol according to claim 4, wherein the fillers comprise calcium carbonate, magnesium carbonate, silica, clay, mica, graphite, zinc oxide, and/or calcium oxide.

7. The plastisol according to claim 4, wherein the rheology control additives comprise petroleum distillates; mineral oil; mineral spirits; fatty acid esters; polyphenyl oligomers; and/or organic solvents.

8. A plastisol comprising a polymeric component, a plasticizer, and a rosin ester resin,
   wherein the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH);
   wherein a weight percent of the rosin ester resin ranges from 30 weight percent to 65 weight percent, based on the total weight of the plasticizer and the rosin ester resin; and
   wherein the fused plastisol has a maximum Tan Delta (Tan δmax) occurring between 30° C. and 70° C. and wherein the Tan δmax ranges from 0.45 to 2.0, when measured on a sample nominally 0.6-0.7 mm thick, 3.2 mm wide, and 10-12 mm long using a Dynamic Mechanical Analyzer with a Tension Clamp at a strain of 0.1% and at a frequency of 1 Hz and a temperature ramp rate of 3° C/min.

9. The plastisol according to claim 8, wherein the rosin ester resin comprises rosin glycerol esters, hydrogenated rosin glycerol esters, rosin pentaerythritol esters, and/or hydrogenated rosin pentaerythritol esters.

10. A method of improving vibration damping of a substrate comprising affixing a plastisol onto the substrate to give a fused plastisol,
    wherein the plastisol comprises a polymeric component, a plasticizer, and a rosin ester resin,
    wherein the plasticizer comprises di-2-ethylhexyl terephthalate (DEHT), tri-2-ethylhexyl trimellitate (TOTM), di-2-ethylhexyl adipate (DOA), di-2-ethylhexyl phthalate (DEHP), di-2-propylheptyl phthalate (DPHP), diisononyl phthalate (DINP), diisodecyl phthalate (DIDP), and/or diisononyl 1,2-cyclohexanedicarboxylate (DINCH);
    wherein a softening point of the rosin ester resin ranges from 60° C. to 96° C.;
    wherein a weight percent of the rosin ester resin ranges from 30 weight percent to 70 weight percent, based on the total weight of the plasticizer and the rosin ester resin; and wherein the fused plastisol has a maximum Tan Delta (Tan δmax) occurring between 30° C. and 70° C. and wherein the Tan δmax ranges from 0.45 to 2.0, when measured on a sample nominally 0.6-0.7 mm thick, 3.2 mm wide, and 10-12 mm long using a Dynamic Mechanical Analyzer with a Tension Clamp at a strain of 0.1% and at a frequency of 1 Hz and a temperature ramp rate of 3° C/min.

11. The method according to claim 10, wherein the affixing comprises
    a. applying the plastisol onto the substrate;
    b. fusing the plastisol to produce a plastisol-covered substrate; and
    c. cooling the plastisol-covered substrate to ambient temperatures.

12. The method according to claim 11, wherein the applying of the plastisol onto the substrate comprises coating the substrate with the plastisol.

13. The method according to claim 10, wherein the affixing comprises
    a. fusing the plastisol into a sheet; and
    b. adhering the sheet to the substrate.

14. The method according to claim 11, wherein the fusing occurs at a temperature range from 100° C. to 220° C. for a time period ranging from 1 minute to 2 hours.

15. The method according to claim 10, wherein the substrate is part of a wheeled vehicle.

16. The method according to claim 10, wherein the plasticizer comprises di-2-ethylhexyl terephthalate (DEHT).

17. The method according to claim 10, wherein the polymeric component comprises polyvinyl chloride, polyvinyl acetate, acrylic polymers, and/or vinyl chloride-containing copolymers.

* * * * *